US010735678B2

United States Patent
Kobayashi et al.

(10) Patent No.: US 10,735,678 B2
(45) Date of Patent: Aug. 4, 2020

(54) IMAGE SENSOR, IMAGING METHOD, AND IMAGING APPARATUS

(71) Applicant: CANON KABUSHIKI KAISHA, Tokyo (JP)

(72) Inventors: Hirokazu Kobayashi, Tokyo (JP); Nobuhiro Takeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 15/272,602

(22) Filed: Sep. 22, 2016

(65) Prior Publication Data

US 2017/0094201 A1    Mar. 30, 2017

(30) Foreign Application Priority Data

Sep. 25, 2015    (JP) ................ 2015-188759

(51) Int. Cl.
    *H04N 5/225*     (2006.01)
    *H04N 5/355*     (2011.01)
    *H04N 5/378*     (2011.01)

(52) U.S. Cl.
    CPC ......... *H04N 5/355* (2013.01); *H04N 5/35509* (2013.01); *H04N 5/35518* (2013.01); *H04N 5/378* (2013.01)

(58) Field of Classification Search
    CPC ........ H04N 5/355; H04N 5/378; H04N 5/369; H04N 5/379
    See application file for complete search history.

(56) References Cited

U.S. PATENT DOCUMENTS

| | | | |
|---|---|---|---|
| 9,294,685 B2 * | 3/2016 | Muramatsu | H04N 5/202 |
| 2005/0062854 A1 | 3/2005 | Shiraishi | |
| 2006/0055991 A1 | 3/2006 | Minakuti et al. | |
| 2008/0284888 A1 * | 11/2008 | Kobayashi | H04N 5/379 348/308 |
| 2009/0041350 A1 * | 2/2009 | Utagawa | H04N 1/40062 382/169 |
| 2011/0317030 A1 | 12/2011 | Ohbuchi et al. | |

(Continued)

FOREIGN PATENT DOCUMENTS

| | | |
|---|---|---|
| CN | 1347059 A | 5/2002 |
| CN | 101156433 A | 4/2008 |

(Continued)

OTHER PUBLICATIONS

The above documents were cited in a British Search Report dated Feb. 15, 2017, that issued in the corresponding British Patent Application No. 1615782.8.

(Continued)

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

There is provided an image sensor comprising: a pixel unit having a plurality of pixels; an A/D converter which converts an image signal from the pixel into a digital image signal; a gradation converter which performs a gradation conversion to the digital image signal; and a selector which selects gradation converting characteristics of the gradation conversion to the digital image signal performed by the gradation converter.

14 Claims, 12 Drawing Sheets

(56) References Cited

U.S. PATENT DOCUMENTS

| | | | | |
|---|---|---|---|---|
| 2015/0077590 A1* | 3/2015 | Kuriyama | ............ | H04N 5/3745 348/231.99 |
| 2015/0179136 A1 | 6/2015 | Miller et al. | | |
| 2016/0057341 A1* | 2/2016 | Nakayama | ........... | H04N 5/2621 348/207.1 |

FOREIGN PATENT DOCUMENTS

| | | | |
|---|---|---|---|
| CN | 101188673 | A | 5/2008 |
| CN | 101211832 | A | 7/2008 |
| CN | 101217621 | A | 7/2008 |
| CN | 101365039 | A | 2/2009 |
| CN | 102316274 | A | 1/2012 |
| CN | 102968768 | A | 3/2013 |
| CN | 104272721 | A | 1/2015 |
| EP | 1578110 | A2 | 9/2005 |
| EP | 1998552 | A2 | 12/2008 |
| JP | 2003-348454 | A | 12/2003 |
| JP | 2004-363726 | A | 12/2004 |
| JP | 2005-294921 | A | 10/2005 |
| JP | 2006-287612 | A | 10/2006 |
| JP | 2007-208833 | A | 8/2007 |
| JP | 2008-301332 | A | 12/2008 |
| JP | 2009-141861 | A | 6/2009 |
| JP | 2011-010184 | A | 1/2011 |
| JP | 2011-119868 | A | 6/2011 |
| JP | 2014-165520 | A | 9/2014 |

OTHER PUBLICATIONS

The above foreign patent documents were cited in the Oct. 12, 2017 Japanese Office Action, without an English Translation, that issued in Japanese Patent Application No. 2015188759.

The above foreign patent documents were cited in a Jun. 14, 2019 Chinese Office Action, with an English Translation, that issued in Chinese Patent Application No. 201610849180.X.

The above patent documents were cited in a Jan. 8, 2020 Chinese Office Action, with an English Translation, that issued in Chinese Patent Application No. 201610849180.X.

* cited by examiner

FIG. 1

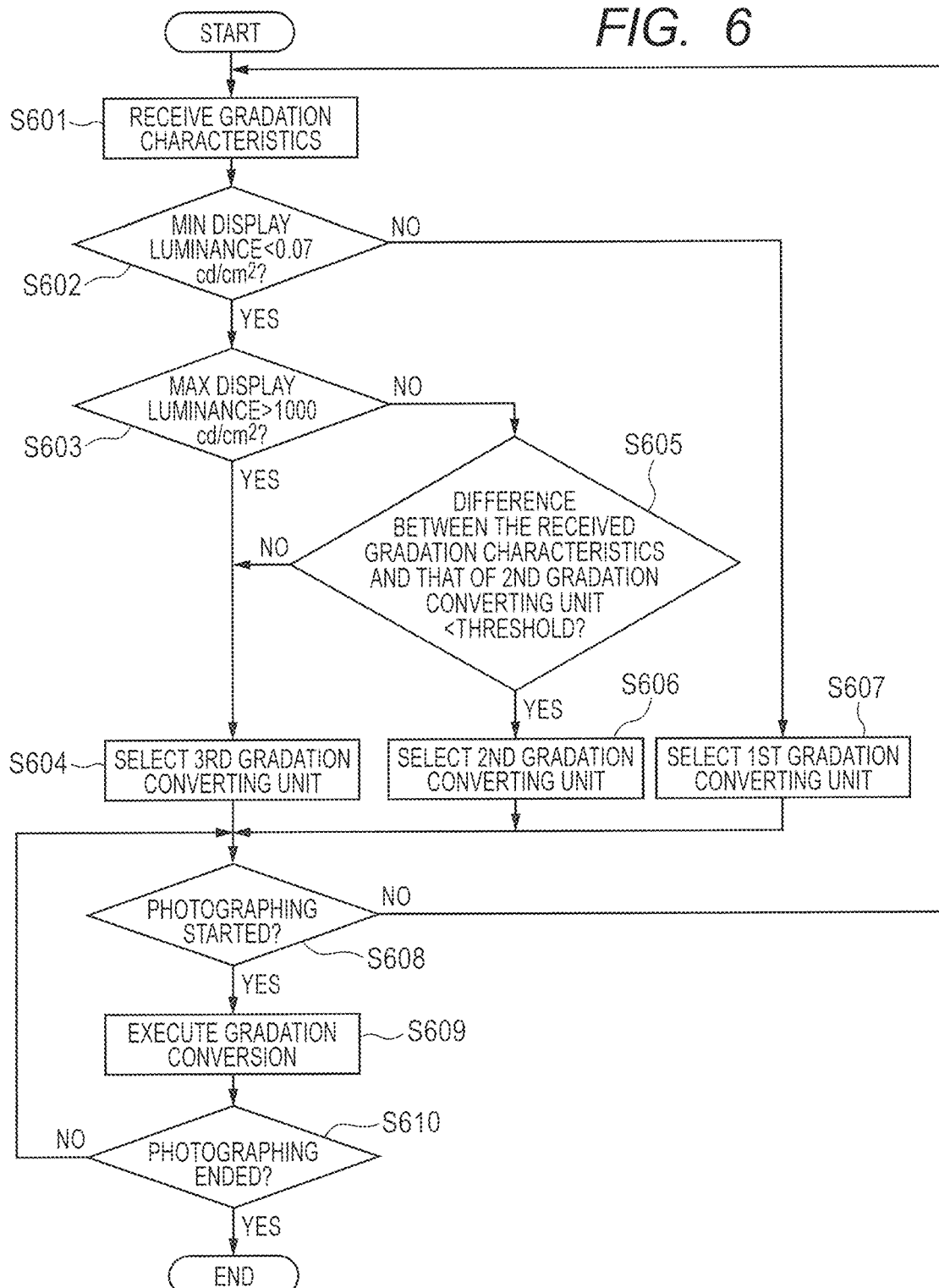

IMAGE SENSOR, IMAGING METHOD, AND IMAGING APPARATUS

BACKGROUND OF THE INVENTION

Field of the Invention

The present invention relates to an image sensor and an imaging method and, more particularly, to a gradation process of an image signal.

Description of the Related Art

In recent years, an ultra high definition video image represented by a 4K resolution image has generally been used and a technique regarding an 8K UHDTV (8K Ultra High Definition Television) has also remarkably been developed. Also in an imaging apparatus, in addition to a request for realization of the large number of pixels and a high frame rate in the related art, a request for realizing 10 or more bits by increasing an information amount per pixel is also increasing.

To realize such requests, it is necessary that an image signal which is output from an image sensor is A/D converted (analog/digital converted) into a multibit digital image signal largely exceeding 10 bits within a predetermined time which is restricted by a frame period or the like. It is also necessary that the A/D converted multibit digital image signal is transmitted to an image processing unit of an imaging apparatus within a predetermined time.

As a unit for transmitting the A/D converted multibit digital image signal to the image processing unit, for example, a high speed differential serial transmission system such as LVDS (Low Voltage Differential signaling) or the like is used. At this time, in order to transmit the multibit digital image signal to the image processing unit within a predetermined time, it is necessary to improve a transmission band width by raising a transmitting frequency or increasing the number of transmission pins. Or, it is necessary that an amount of data which is transmitted is reduced by compressing the multibit digital image signal or the like.

For example, Japanese Patent Application Laid-Open No. 2011-119868 discloses an imaging apparatus having: a compressing unit for reversible-compressing a video signal which was output from an image sensor; an expanding unit for expanding the compressed video signal; and a synthesizing unit for synthesizing the expanded video signal to one frame image. According to such a technique, by reversible-compressing the multibit digital image signal, an amount of data which is transmitted to an image processing unit of the imaging apparatus can be reduced.

However, in order to transmit such a multibit digital image signal that the number of bits is larger than that in the related art to the image processing unit, since it is necessary to raise a transmitting frequency or increase the number of transmission pins, the apparatus becomes an imaging apparatus in which costs are high and a manufacturing difficulty is high. Even in the case of compressing the multibit digital image signal like a technique as disclosed in Japanese Patent Application Laid-Open No. 2011-119868, a scale of a circuit for the compressing process using space information or time information between frames is large and, further, the expanding process in the image processing unit is indispensable, the costs of the imaging apparatus are eventually high.

SUMMARY OF THE INVENTION

According to an aspect of the invention, there is provided an image sensor comprising: a pixel unit having a plurality of pixels; an A/D converter which converts an image signal from the pixel into a digital image signal; a gradation converter which performs a gradation conversion to the digital image signal; and a selector which selects gradation converting characteristics of the gradation conversion to the digital image signal performed by the gradation converter.

Further features of the present invention will become apparent from the following description of exemplary embodiments with reference to the attached drawings.

BRIEF DESCRIPTION OF THE DRAWINGS

FIG. 1 is a block diagram illustrating a construction of an image sensor according to the first embodiment of the invention.

FIG. 6 is a flowchart illustrating an operation sequence of the gradation processing unit in the image sensor according to the first embodiment of the invention.

FIG. 7 is a timing chart illustrating an output signal of the image sensor according to the first embodiment of the invention.

DESCRIPTION OF THE EMBODIMENTS

Figure 2:
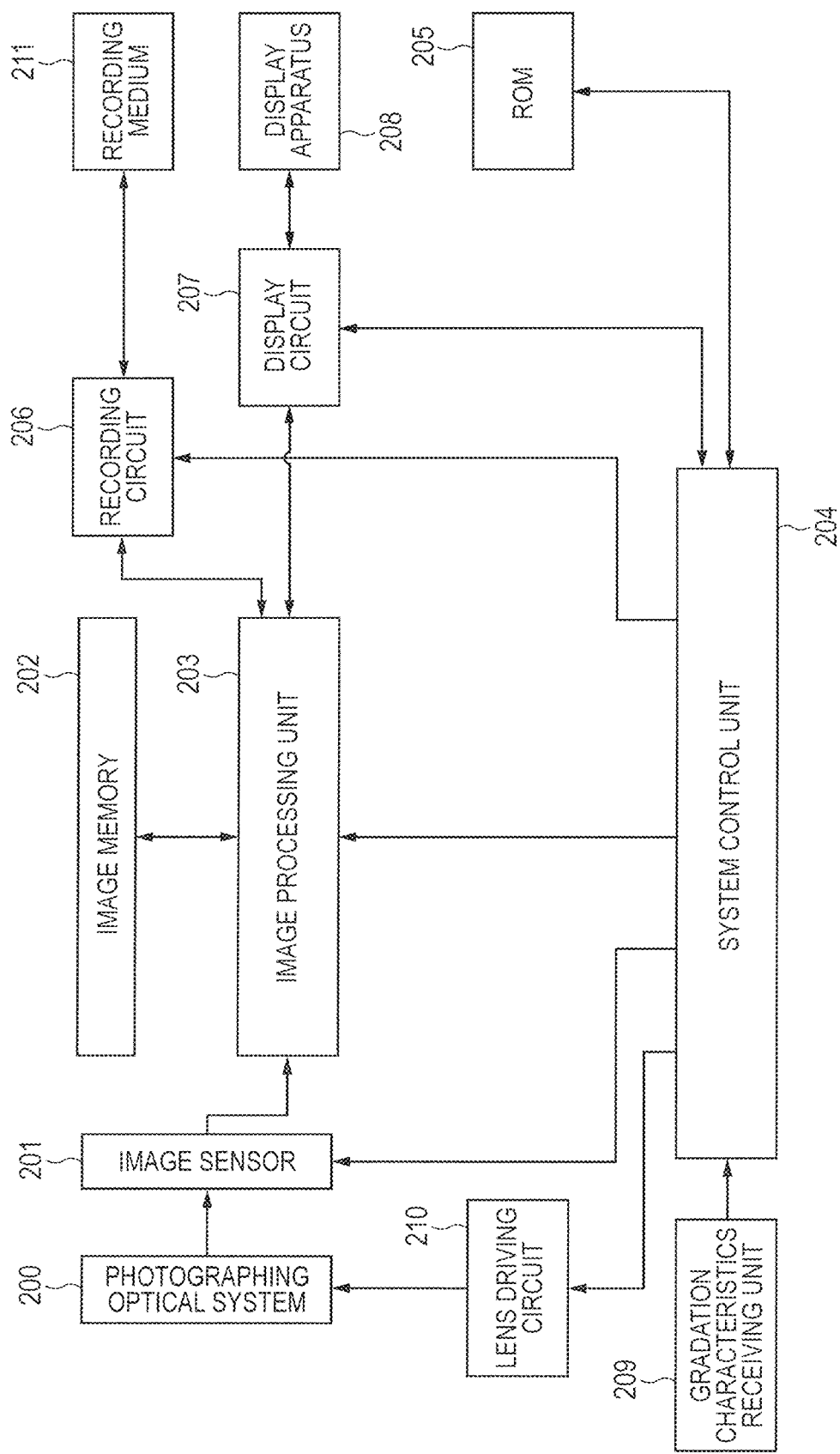
FIG. 2 is a block diagram illustrating a construction of an imaging apparatus to which the image sensor according to the first embodiment of the invention is applied.

Preferred embodiments of the present invention will now be described in detail in accordance with the accompanying drawings.

First Embodiment

As mentioned above, in order to set an information amount per pixel to a value larger than that in the related art, first, it is necessary that an image signal which is output from an image sensor is A/D converted into a multibit digital image signal within a limited time. For example, Japanese Patent Application Laid-Open No. 2009-141861 discloses a technique regarding a pipeline type A/D converting apparatus comprising: a plurality of A/D converting circuits which are cascade-connected to each other; and an A/D converting unit for A/D converting a sample and hold signal by a pipeline format. According to such a technique, within a predetermined time, the image signal can be converted into the multibit digital image signal which can satisfy the request of UHDTV.

Second, it is necessary that the A/D converted multibit digital image signal is transmitted to the image processing unit of the imaging apparatus within a limited time. However, as mentioned above, in order to transmit the multibit digital image signal in which the number of bits is fairly larger than 10 bits in the related art to the image processing unit, the apparatus becomes an imaging apparatus in which a wide transmission band width is required, costs are high, and a manufacturing difficulty is high.

Naturally, it is known that a discrimination threshold of a luminance change based on human visual sensation characteristics differs depending on the luminance. There is such a tendency that the lower the luminance is, a small contrast step is recognized, and the higher the luminance is, the human being becomes insensitive. In the embodiment, therefore, a method whereby input/output characteristics of a gradation conversion of a digital image signal are selected on the basis of such human visual sensation characteristics in accordance with gradation characteristics of a display apparatus, luminance information of a photographing scene, or the like will be described.

Figure 1:
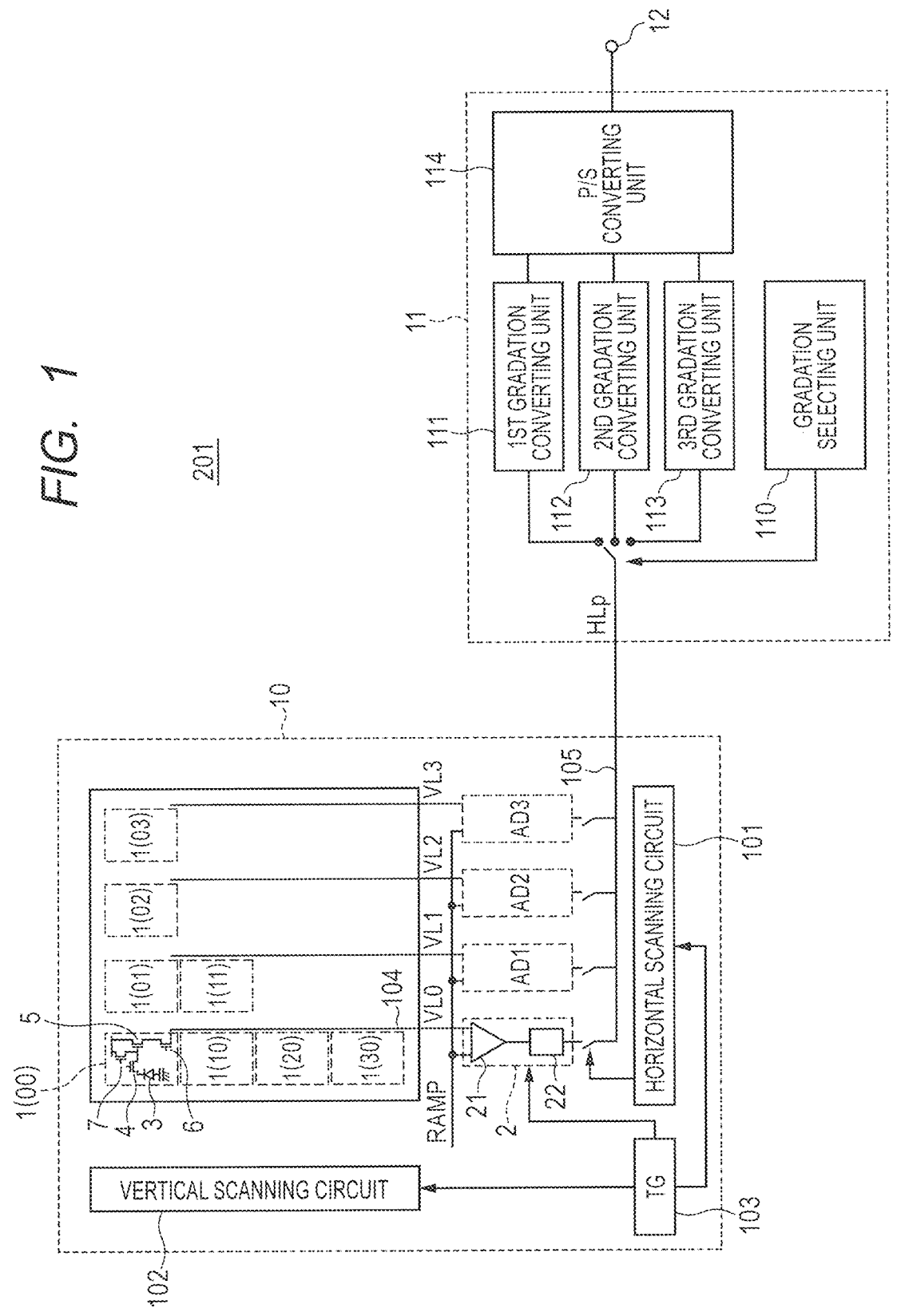

First, a construction of an image sensor according to the first embodiment of the invention will be described with reference to FIGS. 1 to 7. FIG. 1 is an example of a block diagram illustrating a construction of an image sensor 201 according to the first embodiment of the invention. The image sensor 201 of the embodiment illustrated in FIG. 1 is constructed by an imaging unit 10 and a gradation processing unit 11. The imaging unit 10 has a plurality of pixels 1, a plurality of A/D converters 2, a horizontal scanning circuit 101, a vertical scanning circuit 102, and a timing generating circuit 103. The gradation processing unit 11 has a gradation selecting unit 110, a plurality of gradation converting units 111 to 113, and a P/S converting unit 114.

The imaging unit 10 is constructed so as to have the plurality of pixels 1 arranged two-dimensionally in the row direction and the column direction. In FIG. 1, a pixel 1 (pq) denotes a pixel existing at a position specified by the p-th row and the q-th column. In FIG. 1, although component elements of only the pixel 1 (00) are illustrated and component elements of other pixels are not shown, each pixel 1 (pq) has a similar construction. Although the pixel 1 (pq) of the p-th row and the q-th column will be described hereinbelow as a representative pixel, this is true of the other pixels. The pixel 1 (pq) is constructed so as to have a photodiode 3, a transfer transistor 4, an amplifying transistor 5, a selecting transistor 6, and a resetting transistor 7.

The photodiode 3 photoelectrically converts light which entered through a photographing optical system (refer to FIG. 2, which will be described hereinafter) and generates charges corresponding to a light intensity. The transfer transistor 4 transfers the charges generated in the photodiode 3 to a transfer node. The transfer node is a floating diffusion region which is formed at a connecting point of three terminals of a drain of the transfer transistor 4, a source of the resetting transistor 7, and a gate of the amplifying transistor 5. The charges transferred from the photodiode 3 are held in the transfer node. The amplifying transistor 5 amplifies a signal corresponding to an amount of charges held in the transfer node and outputs. The selecting transistor 6 selects the pixel 1 which is connected to a column output line 104. The resetting transistor 7 resets the charges held in the transfer node by a predetermined power source.

The vertical scanning circuit 102 performs the pixel selection in the column direction by a method whereby the transfer transistor 4, the selecting transistor 6, and the resetting transistor 7 are sequentially controlled at predetermined timing in the vertical direction (column direction), or the like. A source terminal of the selecting transistor 6 is connected to the column output line 104 of the same column and outputs a voltage corresponding to the amount of charges generated in the photodiode 3 to the A/D converter 2 of the same column. $VL_q$ (q=0, 1, . . . ) shown in FIG. 1 denotes a voltage value of the column output line 104 of the q-th column. $AD_q$ ((q=0, 1, . . . ) denotes the A/D converter 2 of the q-th column.

The A/D converter 2 is constructed so as to have a comparator 21 and a counter circuit 22. The comparator 21 compares the voltage value $VL_q$ of the column output line 104 with a RAMP signal which increases or decreases in proportion to a time. The counter circuit 22 inputs an output from the comparator 21 to an Enable terminal and executes or stops a counting operation in accordance with a result of the comparison between the voltage value $VL_q$ of the column output line and the RAMP signal. Thus, a signal value corresponding to the amount of charges generated in the photodiode 3 is held as a count value of the counter circuit 22.

The horizontal scanning circuit 101 sequentially selects the count value held in the counter circuit 22 in the horizontal direction (row direction) and outputs to a horizontal output line 105. Thus, a digital image signal $HL_p$ of one row of the p-th row is read out. This is true of the rows other than the p-th row. The timing generating circuit 103 outputs timing signals to the horizontal scanning circuit 101, the vertical scanning circuit 102, the A/D converter 2, and the like. The timing signals may be realized by selecting several patterns stored in a ROM: or the like, which will be described hereinafter. A driving pattern of the timing generating circuit 103 is controlled by a system control unit (refer to FIG. 2, which will be described herein later).

The first gradation converting unit 111 sequentially inputs the digital image signal $HL_p$ transferred to the horizontal output line 105 into an LUT (LookUp Table) having predetermined input/output characteristics, gradation converts, and outputs. This is true of the second gradation converting unit 112 and the third gradation converting unit 113. The plurality of gradation converting units 111 to 113 have different nonlinear input/output characteristics and one of them is selected by the gradation selecting unit 110. The P/S converting unit 114 is well-known parallel/serial converting unit. The P/S converting unit 114 converts the image signal which was gradation converted by one of the gradation converting units 111 to 113 into a signal of a high speed serial transmission format such as LVDS or the like and outputs to an output terminal 12.

Subsequently, an imaging apparatus to which the image sensor 201 of the embodiment can be applied will be described. FIG. 2 is an example of a block diagram illustrating a construction of the imaging apparatus to which the image sensor 201 according to the first embodiment of the invention is applied. The imaging apparatus of the embodiment illustrated in FIG. 2 has a photographing optical system 200, the image sensor 201, an image memory 202, an image processing unit 203, a system control unit 204, a ROM 205, and a recording circuit 206. The imaging apparatus also has a display circuit 207, a display apparatus 208, a gradation characteristics receiving unit 209, a lens driving circuit 210, and a recording medium 211.

The system control unit 204 controls the whole imaging apparatus. All or a part of programs which are executed by the system control unit 204 has been stored into the ROM 205. A necessary program is read out and executed every control mode. The system control unit 204 adjusts a focus of the photographing optical system 200 by driving the lens driving circuit 210. The image sensor 201 receives light focused by the photographing optical system 200 which was focus adjusted, photoelectrically converts the light into an electric image signal, and A/D converts and gradation converts the image signal as mentioned above. The gradation converted image signal is sequentially transferred to the image processing unit 203, is collected every frame, and is temporarily stored into the image memory 202. After the image signal of one or a plurality of frames was temporarily stored into the image memory 202, predetermined image processes are executed by the image processing unit 203. For example, image processes such as white balance, 3-plane simultaneous process, noise reduction, sharpness adjustment, and the like which are not executed in the image sensor 201 are included in the image processes which are executed by the image processing unit 203. The image-processed image is further subjected to a compression such as JPEG (Joint Photographic Experts Group) or the like in the recording circuit 206 and, thereafter, is recorded into the recording medium 211.

After the image-processed image was subjected to a display format adjustment regarding a resolution such as 8K UHDTV, 4K, HDTV, or the like, a frame rate, a luminance area, a color area, and the like by the display circuit 207, a resultant image can be also displayed to the display apparatus 208. The display apparatus 208 may be constructed integratedly with the imaging apparatus or may be constructed separately from the imaging apparatus. In the latter case, the imaging apparatus is connected to the display apparatus 208 through a connecting terminal.

The gradation selecting unit 110 selects one of the first gradation converting unit 111, the second gradation converting unit 112, and the third gradation converting unit 113 by the control of the system control unit 204. For example, in the embodiment, the gradation converting unit 111, 112, or 113 having the most suitable input/output characteristics is selected on the basis of gradation characteristics regarding a display luminance range and the contrast step of the display apparatus 208 received from the display apparatus 208 through the display circuit 207. Or, information of the gradation characteristics can be also received through the gradation characteristics receiving unit 209. In this case, the gradation characteristics receiving unit 209 may be constructed by a U/I (User Interface) or the like of the imaging apparatus.

Generally, the contrast step of the display apparatus 208 changes in dependence on its display luminance L. Especially, as shown in the following equation (1) specified in ITU-R Rec. BT1886, an input signal level standardized by the maximum value, that is, a signal level V ($0 \leq V \leq 1$) of the output terminal 12 of the image sensor 201 to the power of $\gamma$ is displayed as a base.

$$L = a(V+b)^{\gamma} \ldots \quad (1)$$

Where, a and b denote predetermined constants. In this case, the contrast step can be expressed as shown in the following equation (2) by using a differential value of the above equation (1).

$$\begin{aligned}(dL/dV)/L &= (a\gamma(V+b)^{\gamma-1})/L \\ &= (a\gamma(V+b)^{\gamma-1})/(a(V+b)^{\gamma}) \\ &= \gamma/(V+b)\end{aligned} \quad (2)$$

As mentioned above, generally, since the contrast step is proportional to the $\gamma$ value, it can be substituted by the $\gamma$ value.

It is now assumed that a minimum display luminance Lb is a luminance of the display apparatus which is also caused as V=0. That is, Lb=a (b)$\gamma$. It is also assumed that a maximum display luminance Lw is a highest luminance of the display apparatus which cannot display in excess of V=1. That is, Lw=a(1+b)$\gamma$. Values of the constants a and b can be obtained from Lb and Lw by the following equations (3) and (4).

$$a = (Lw^{1/\gamma} - Lb^{1/\gamma})^{\gamma} \ldots \quad (3)$$

$$b = Lb^{1/\gamma}(Lw^{1/\gamma} - LB^{1/\gamma}) \ldots \quad (4)$$

The gradation selecting unit 110 receives information of the gradation characteristics of the display apparatus 208 including the contrast step substituted by, for example, the $\gamma$ value and the display luminance range specified by the maximum display luminance Lw through the system control unit 204. The input/output characteristics in which a degree of coincidence with an inverse function of the equation (1) is highest in the display luminance range Lw to Lb are selected from the gradation converting units 111 to 113.

A contrast sensitivity function S(L, u) shown by the following equation (5) is known as a function which depends on a spatial frequency u and the display luminance L on the basis of the human visual sensation characteristics.

$$S(L, u) = \frac{5200 e^{-0.0016 u^2 (1+100/L)^{0.08}}}{\sqrt{(2+0.64 u^2)\left(\frac{63}{L^{0.83}} + \frac{1}{1 - e^{-0.02 u^2}}\right)}} \quad (5)$$

Figure 3:
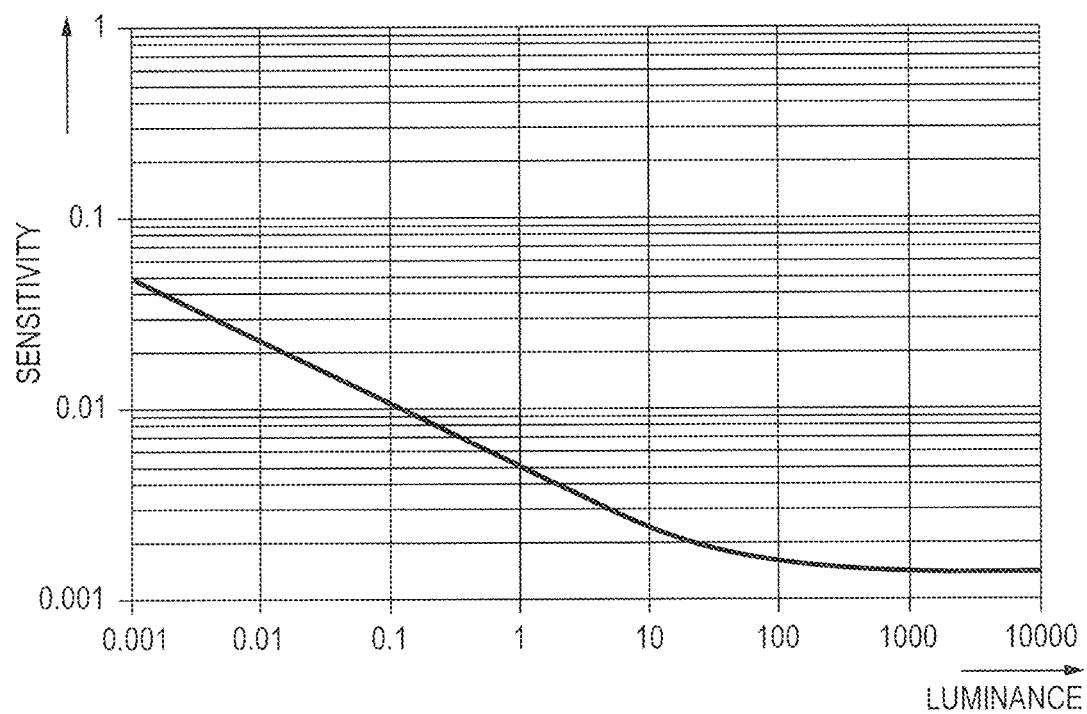
FIG. 3 is an example of gradation characteristics illustrating a relation between a display luminance and a contrast step of an ideal display apparatus according to the invention.

FIG. 3 is an example of the gradation characteristics illustrating a relation between the display luminance and the contrast step in the ideal display apparatus in which the conditions are presumed. An axis of ordinate in FIG. 3 indicates a reciprocal number of the contrast sensitivity function S(L, u) shown by the above equation (5) and an axis of abscissa indicates the display luminance L (cd/cm,$^2$). The input/output characteristics cannot be expressed only by the $\gamma$ value. As a general tendency, it is desirable that many gradations are allocated to the luminance which is equal to or less than a few cd/cm$^2$ within the display luminance range of the display apparatus 208 and the number of gradations which are allocated to the luminance which is equal to or larger than tens of cd/cm$^2$ out of the display luminance range. By instructing the gradation selecting unit 110 through the gradation characteristics receiving unit 209, the user can also select the optimum one of the plurality of gradation converting units 111 to 113.

As input/output characteristics of the gradation converting units 111 to 113 to be selected at this time, such a gradation conversion in which the luminance specified in, for example, ITU-R Rec. BT2020, ITU-R Rec. BT709, or the like to the power of 0.45 is used as a base can be used. Or, such a gradation conversion in which a logarithm (LOG) which is frequently used in a movie expression is used as a base can be also used. Further, if the gradation conversion is not particularly necessary, a linear conversion can be also selected.

Although the gradation processing unit 11 may be formed on a circuit board different from that of the imaging unit 10, for example, it may be laminated and formed onto the surface on the side opposite to the light incident surface of the pixel 1 (p1) of the imaging unit 10. In this case, a board on which the pixel 1 (pq) is formed and the board on which the gradation processing unit 11 and the like are formed are formed by different steps and, thereafter, those boards are joined. It is desirable to form the image sensor as what is called a back face incident type (back face irradiation type) image sensor 201 in which the board on which the gradation processing unit 11 and the like were formed is used as a supporting board and the light incident surface of the pixel 1 (pq) is ground so as to be exposed. In this case, it is not always necessary that the vertical scanning circuit 102, the horizontal scanning circuit 101, and the like of the imaging unit 10 exist on the board on which the pixel 1 (pq) was formed. For example, it is also possible to construct in such a manner that they are formed on the supporting board side together with the gradation processing unit 11 and the like, and when those boards are joined, the driving of various kinds of transistors and the like constructing the pixel 1 (pq) is controlled by a predetermined electrical contact.

Figure 4:
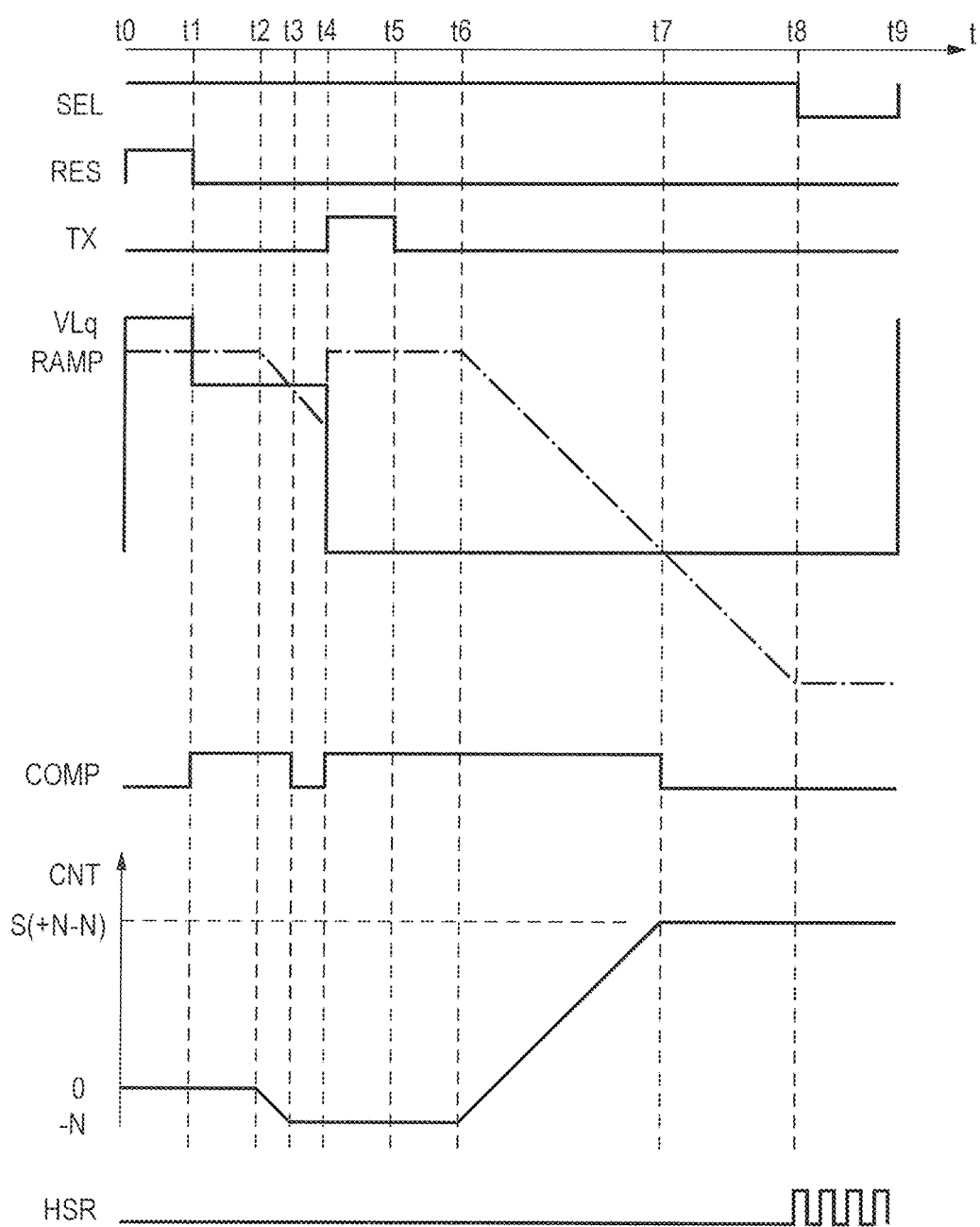
FIG. 4 is a timing chart illustrating a driving method of the image sensor according to the first embodiment of the invention.

Subsequently, a driving method of the imaging unit 10 and an operation sequence of the gradation processing unit 11 will be described. FIG. 4 is an example of a timing chart illustrating a driving method of the image sensor 201 at the time when the pixels of one row of the imaging unit 10 according to the first embodiment of the invention are A/D converted in parallel.

An axis of abscissa indicates time t and an axis of ordinate indicates a magnitude of the signal. Control signals SEE, RES, and TX are supplied to gate terminals of the selecting transistor 6, the resetting transistor 7, and the transfer transistor 4 in the pixel 1 (pq), respectively. Those transistors are turned on when a voltage of each control signal supplied to the gate terminal is high, and they are turned off when it is low. FIG. 4 also shows a change in signal level of each of the voltage VLq of the column output line 104 of the q-th column, the RAMP signal, an output COMP of the comparator 21, a count value CNT of the counter circuit 22, and a horizontal scanning signal HSR which is generated by the horizontal scanning circuit 101.

For a period of time between time t0 and t1, the control signal RES is set to the high level and the resetting transistor 7 is turned on. Thus, the transfer node is reset to a predetermined power voltage. Subsequently, at time t1, since the control signal RES is set to the low level, the resetting transistor 7 is turned off. Consequently, the transfer node is set into a floating state and the voltage value becomes stable at time t2 after the elapse of a predetermined time. Since the control signal SEL is at the high level for such a period of time, the voltage of the transfer node has been transmitted to the column output line 104 through the selecting transistor 6. That is, the voltage VLq of the column output line 104 in FIG. 4 shows a time-dependent change of the voltage value of the transfer node. Although the voltage value VLq of the column output line 104 of the q-th column is at the high level since the gate of the resetting transistor 7 is turned on for a period of time between time t1 and t2, an influence is not particularly exerted on the subsequent operation.

At time t2 when the voltage value VLq of the column output line 104 becomes stable, the RAMP signal is generated to measure a reference level N. By counting an elapsed time until the RAMP signal and the voltage value VLq of the column output line 104 are equal, an A/D conversion value of the reference level N before the signal charges are transferred is measured. At time t2, since VLq<RAMP, the output voltage COMP of the comparator 21 is high. The counter circuit 22 operates by using the output voltage COMP of the comparator 21 as an Enable signal. At time t3, since VLq>RAMP, the output voltage COMP of the comparator 21 changes to the low level. Thus, the counter circuit 22 enters a stop state and the A/D conversion of the reference level N is automatically finished. For a period of time between tame t4 and t5, the control signal TX is set to the high level. Therefore, the transfer transistor 4 is turned on and the charges which were photoelectrically converted by the photodiode 3 are transferred to the transfer node. Thus, a voltage drop due to the charges transferred to the transfer node appears as a voltage VLq of the column output line 104.

At time t6 when the voltage value VLq of the column output line 104 becomes stable, the RAMP signal is generated to measure a signal level S. By counting an elapsed time until the RAMP signal and the voltage value VLq of the column output line 104 are equal, an A/D conversion value of the signal level S corresponding to the signal charges is measured. If the counter circuit 22 was down-counted to the reference level N until time t6, when the counting operation is started from time t6, a sum of the reference level N and the signal level S corresponding to the signal charges is up-counted. Therefore, at time t7, VLq>RAMP and when the counting operation is finished, the signal level S is held as a count value of the counter circuit 22. Although reasons will be described hereinafter, a value of about 24 bits is desirable as a precision of the A/D conversion, that is, as a bit width. The precision of the A/D conversion and the bit width are determined by a decree of inclination of the RAMP signal, a master clock frequency during the counting operation, or the like.

At time t8, the control signal SEL is set to the low level and the selecting transistor 6 is turned off. Thus, the output to the column output line 104 is finished. After that, for a period of time between time t8 and t9, the horizontal scanning signal is generated and the A/D converted signal level S recorded in the counter circuit 22 is sequentially selected in the horizontal direction. Consequently, the digital image signals of one row are column-sequentially transferred to the horizontal output line 105.

Figure 5A:
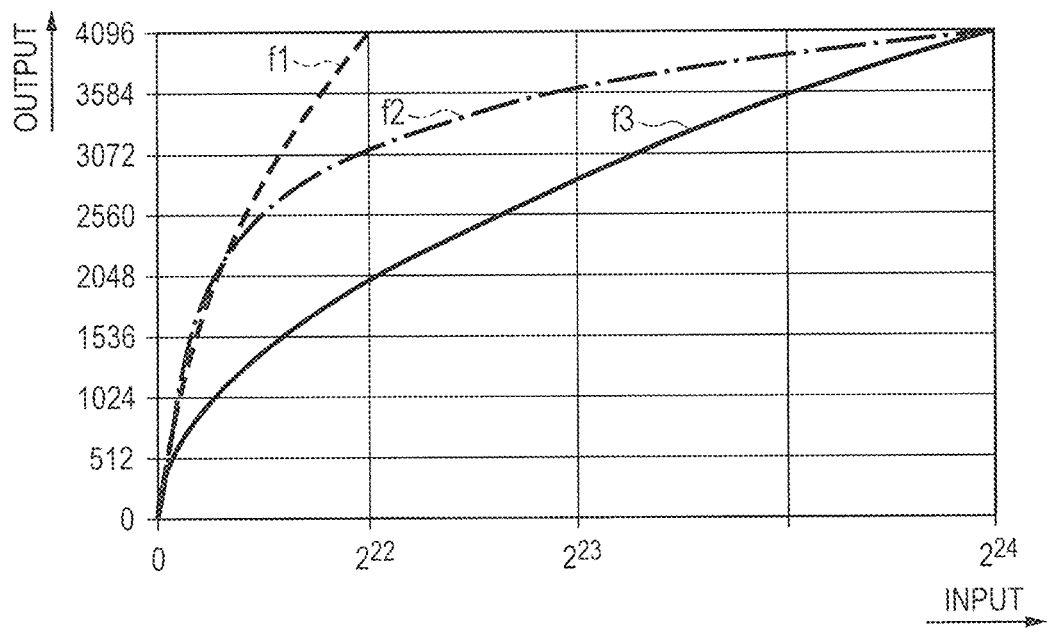
FIGS. 5A and 5B are diagrams illustrating input/output characteristics of gradation converting units in the image sensor according to the first embodiment of the invention.
Figure 5B:
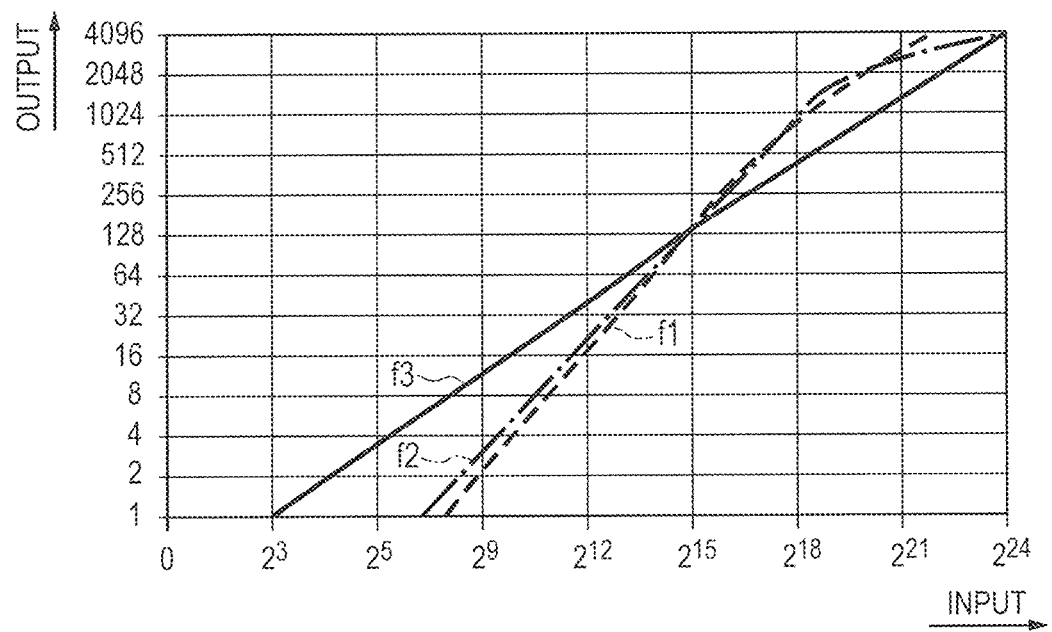

Subsequently, the operation sequence of the gradation processing unit 11 will be described with reference to FIGS. 5A, 5B, and 6. FIGS. 5A and 5B are diagrams illustrating the input/output characteristics of the gradation converting units 111 to 113 in the image sensor 201 according to the first embodiment of the invention. An axis of abscissa indicates a level of an input signal which is input as a digital image signal. An axis of ordinate indicates an output level. In FIG. 5A, both of the axis of abscissa and the axis of ordinate are expressed by a linear scale. In FIG. 5B, both of the axis of abscissa and the axis of ordinate are expressed by a logarithmic scale.

In FIGS. 5A and 5B, a broken line f1 indicates the input/output characteristics of the first gradation converting unit 111. The broken line f1 indicates the well-known input/output characteristics in which the input to the power of 0.45 is used as a base and it is assumed that the input is set to a 22-bit value to the extent of $2^{22}$ LSB and the output is set to a 12-bit value to the extent of $2^{12}$ LSB. An alternate long and short dash line f2 indicates the input/output characteristics of the second gradation converting unit 112. The alternate long and short dash line f2 indicates the input/output characteristics in which a logarithm (LOG) of the input which is well-known in a movie expression or the like is used as a base and it is assumed that the input is set to a 24-bit value to the extent of $2^{24}$ LSB and the output is set to a 12-bit value to the extent of $2^{12}$ LSB. When comparing with the input/output characteristics of the first gradation converting unit 111 shown by the broken line f1, the inclination (differential value by the input) at a low luminance is larger and the gradations of the number larger than that of the input/output characteristics of the first gradation converting unit 111 are allocated. On the other hand, at a high luminance exceeding $2^{22}$ LSB, although the number of gradations which are allocated is small, the characteristics of f2 have a change amount without being clipped to $2^{12}$ LSB. While detailed gradations are required at a display luminance which is equal to or smaller than 50 cd/cm$^2$ in the movie expression, it is required that a small gradation change remains in spite of a high luminance so as to leave a room of edition in a scene including many highlight portions or the like. Now, assuming that the axis of abscissa has a proportional relation with the display luminance of the display apparatus 208 and, for example, $2^{22}$ LSB of the axis of abscissa corresponds to 1000 cd/cm$^2$, since the axis of abscissa corresponding to 1 LSB of the axis of ordinate is equal to about 290 LSB, it is equal to 0.07 cd/cm$^2$. That is, the input/output characteristics of the first gradation converting unit 111 are suitable in the case of using the display apparatus 208 in which 1000 cd/cm$^2$ is the maximum display luminance and 0.07 cd/cm$^2$ is the minimum display laminance. A degree of coincidence with the inverse function of the gradation characteristics shown in the equation (1) specified in ITU-R Rec. BT1886 is highest. On the other hand, if the logarithm (LOG) is used as a base like the input/output characteristics of the second gradation converting unit 112 shown by the alternate long and short dash line f2, although a gradation of a certain extent can be also allocated to a highlight portion, a degree of coincidence with the inverse function of the gradation characteristics shown in the equation (1) is low. Similarly, in FIGS. 5A and 5B, a solid line f3 indicates input/output characteristics of the third gradation converting unit 113. According to the input/output characteristics of the third gradation converting unit 113 shown by the solid line f3, the maximum display luminance is high and is equal to 4000 cd/cm$^2$ and the minimum display luminance is low and is equal to 0.002 cd/cm$^2$. Therefore, the input/output characteristics of the third gradation converting unit 113 are the input/output characteristics suitable for the display apparatus 208 of high performance. Ordinarily, in the display apparatus having such a wide display luminance range, in order to make a coarse step at the time when the display luminance has been changed by the minimum gradation of 1 LSB inconspicuous, it is necessary to improve a quantization precision of the signal by such a changed amount and to increase a bit width. At this time, if a gradation precision which uniform and sufficient irrespective of the luminance is prepared, it is fairly wasteful in the transmission of the digital signal. Therefore, in the case of using the input/output characteristics of the third gradation converting unit 113, the output is settled to the output value to the extent of $2^{12}$ LSB and the signal is converted into the image signal of the bit width of 12 bits in accordance with the minimum contrast step in which the human being perceives and which has been described in FIG. 3.

FIG. 6 is an example of a flowchart illustrating an operation sequence of the gradation processing unit 11 in the image sensor 201 according to the first embodiment of the invention. In step S601, information regarding the gradation characteristics of the display apparatus 208 is received. The display luminance range specified by the minimum display luminance Lb and the maximum display luminance Lw and the information regarding the contrast step are included in the information which is received. In step S602, the minimum display luminance is discriminated. If the minimum display luminance is smaller than 0.07 cd/cm$^2$, the processing routine advances to step S603. If it is equal to or larger than 0.07 cd/cm$^2$, step S607 follows. In step S603, the maximum display luminance is discriminated. If the maximum display luminance is larger than 1000 cd/cm$^2$, step S604 follows. If it is equal to or smaller than 1000 cd/cm$^2$, step S605 follows.

In step S604, the third gradation converting unit 113, that is, the input/output characteristics suitable for the display apparatus whose display luminance range is wide are selected. In step S607, the first gradation converting unit 111, that is, the input/output characteristics suitable for the display apparatus whose display luminance range is narrow are selected.

In step S605, a degree of coincidence with an inverse function of the second gradation converting unit 112 is obtained. That is, since the inverse function of the second gradation converting unit 112 is an exponential function of the luminance, a difference between such a contrast step (predetermined value) and the contrast step of the display apparatus 208 is calculated and a value within a range from the minimum display luminance to the maximum display luminance is integrated. In this instance, the difference may be calculated by adding a weight to the integration value of the luminance which is equal to or smaller than 1000 cd/cm$^2$ by particularly attaching an importance to the gradation characteristics of the low luminance. Such an integration value is compared as an error with a predetermined threshold value. If it is smaller than the threshold value, step S606 follows. If it is equal to or larger than the threshold value, step S604 follows. In step S606, the second gradation converting unit 112, that is, such input/output characteristics that the information of 4000 cd/cm$^2$ is maintained while allocating many gradations to the low luminance are selected.

When the photographing is started in step S608, in step S609, the gradation conversion is executed to a frame of a photographed video image on the basis of the input/output characteristics selected in steps S604, S606, and S607. If the photographing is not started, the processing routine is returned to step S601 and the foregoing processes are repeated. When the photographing is ended in step S610, the operation sequence of the gradation processing unit 11 is finished. If the photographing is not ended and the photographing of the next frame is started, the gradation conversion of such a frame is executed.

In order to convert the image signal of the output to the extent of $2^{12}$ LSB so as to have a quantization error as small as possible in spite of the nonlinear input/output characteristics as shown in the gradation converting units 111 to 113, a comparative high request is also caused in the input signal, that is, not only the A/D converting precision of the image sensor 201 but also the bit width. It is theoretically desired that the maximum value of each differential coefficient (inclination) of the gradation converting units 111 to 113 is substantially equal to or smaller than 1 LSB. According to the second gradation converting unit 112 whose differential coefficient largest among the gradation converting units 111 to 113, that is, the input/output characteristics in which the logarithm (LOG) is used as a base, if the A/D conversion of the bit width of 23 to 24 bits is executed, the foregoing request can be satisfied. According to the input/output characteristics of the third gradation converting unit 113, if the A/D conversion of the bit width of 21 to 24 bits is executed at an extremely low luminance near the output of 1 LSB, the foregoing request can be satisfied.

The signal which was gradation-converted as mentioned above is converted into a signal of a high speed differential serial transmission format such as LVDS or the like by the P/S converting unit 114. Since the signal is a signal of a bit width of 12 bits even in the case of transmitting through any one of the gradation converting units 111 to 113, it is converted into the signal of a transmission format as illustrated in FIG. 7. In FIG. 7, D11 of a data line Data indicates the most significant bit of the pixel signal and D0 indicates the least significant bit. From the data line Data, data is sequentially transmitted from the most significant bit as information showing whether each of the bits D11 to D0 is equal to 1 or 0 synchronously with both of a leading edge and a trailing edge of a clock line LVCLK. For example, assuming that the clock line LVCLK is equal to 250 MHz, since the data of an amount of 2 bits in total is transmitted at both of a leading edge and a trailing edge of the clock, a transmitting speed is equal to 500 Mbps. Such a system is what is called a double data rate (DDR) system.

In the case where the gradation processing unit 11 does not exist and the wide data of an amount of 24 bits within a range from the minimum display luminance to the maximum display luminance as mentioned above is transmitted without being gradation-converted, assuming that the transmitting speed is equal, since the data of a double amount is transmitted, it takes a double time. Therefore, in order to transmit the data for the same time, a double transmitting speed, that is, 1 Gbps is required. This results in an increase in current to raise a through rate at the time of a microfabrication process or a polarity change of a semiconductor, an increase in number of terminals for the purpose of adding a pre-emphasis circuit or realizing a parallel construction by using a double circuit configuration, or the like, so that the costs rise. Further, since it is necessary to design the circuit board in consideration of impedance matching with the image processing unit 203, or the like, a manufacturing difficulty rises.

In the embodiment, therefore, the digital image signal having a bit width of 24 bits from the A/D converter in the imaging unit 10 is gradation-converted into an image signal having a bit width of 12 bits by the gradation converting units 111 to 113 and is output to the output terminal 12. Thus, a data transmission amount per pixel can be reduced. Therefore, the image signal can be transmitted to the image processing unit 203 without using a number of output terminals 12 in a parallel manner or remarkably raising an LVDS data rate. Moreover, since a plurality of gradation converting units 111 to 113 having different input/output characteristics are provided and can be arbitrarily selected, the gradation conversion can be executed by reflecting the necessary gradation characteristics by a request from the display apparatus 208 or the user. The repetitive gradation conversion or a dropout of the information associated therewith can be prevented. In the embodiment, the input bit width to the gradation converting units 111 to 113 and the output bit width from the gradation converting units 111 to 113 are not necessarily limited to the foregoing values. It is sufficient that the output bit width from the gradation converting units 111 to 113 is smaller than the input bit width to the gradation converting units 111 to 113.

As mentioned above, in the embodiment, a plurality of gradation converting units having the different nonlinear input/output characteristics for gradation-converting the digital image signal into an image signal having a smaller hit width are provided. On the basis of the gradation characteristics of the display apparatus for displaying the image signal, the gradation selecting unit selects the gradation converting unit which is used for the gradation conversion of the digital image signal from the plurality of gradation converting units. Thus, the costs are reduced and the transmission data amount of the digital image signal can be decreased.

It the transmission data amount per pixel can be decreased, since a time which is required for the high speed differential serial transmission can be shortened, a transmission band width can be suppressed. The gradation converting unit having the optimum input/output characteristics can be selected in accordance with the gradation characteristics of the display apparatus, the luminance information of a photographing scene, or the like. Further, the invention can be also applied to an imaging apparatus in which a dynamic range expanding process by the high gradation image conversion is executed while suppressing the increase in band width.

Second Embodiment

A construction of an image sensor according to the second embodiment of the invention will be described hereinbelow with reference to FIGS. 8 and 10. In the first embodiment, the method of selecting the optimum one of the gradation converting units 111 to 113 on the basis of the information of the gradation characteristics of the display apparatus has been described. In the second embodiment, further, a method of selecting the optimum one of the gradation converting units 111 to 113 in accordance with the luminance information of the photographed video image will be described.

For example, when a large amount of high luminance information which is equal to or larger than tens of cd/cm$^2$ is included in the photographed image, if such a process that many gradations are allocated to middle/low luminance information smaller than a few cd/cm$^2$ by decreasing such high luminance information is executed, it is fairly wasteful. In the embodiment, therefore, such an operation that the gradation conversion is uniformly performed irrespective of the luminance information of the photographed image is not executed but such an operation that the gradation is selected so as to be adaptive to a scene and an obtained image signal is output to the gradation processing unit is considered. That is, in the embodiment, the method of selecting the gradation converting unit having the optimum input/output characteristics not only on the basis of an instruction received through the gradation characteristics receiving unit 209 or the information of the gradation characteristics of the display apparatus 208 but also in accordance with the luminance information which is obtained by an analysis of the photographing scene will be described.

Figure 8:
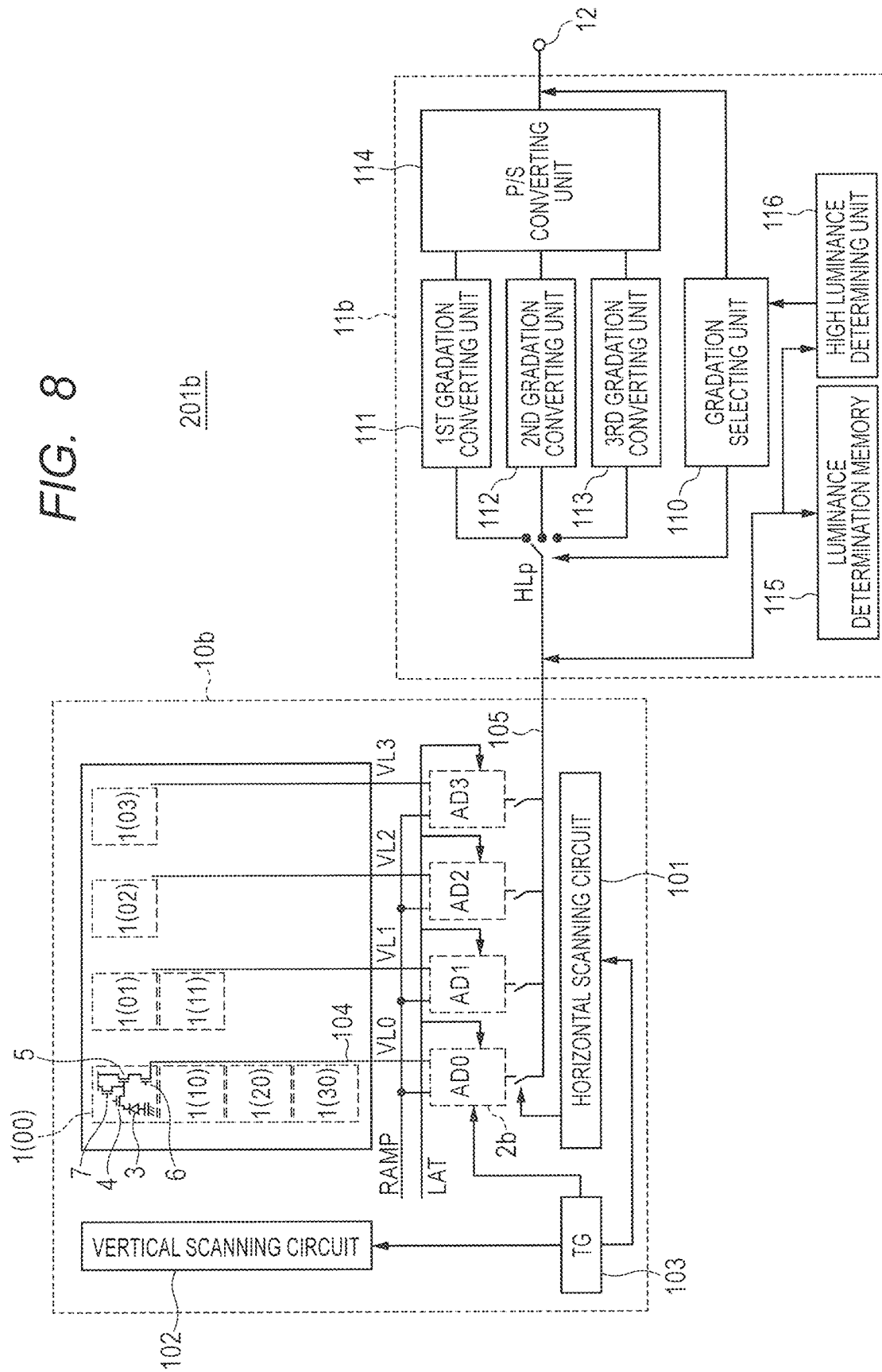
FIG. 8 is a block diagram illustrating a construction of an image sensor according to the second embodiment of the invention.

FIG. 8 is an example of a block diagram illustrating a construction of an image sensor 201b according to the second embodiment of the invention. As compared with the image sensor 201 of the first embodiment illustrated in FIG. 1, the image sensor 201b of the second embodiment differs with respect to a point that a gradation processing unit 11*b* further has a luminance determination memory 115 and a high luminance determining unit 116. A construction of an A/D converter 2*b* of an imaging unit 20*b* differs. The second embodiment also differs from the first embodiment with respect to a point that the image sensor 201*b* has a signal line for adding a flag to specify the gradation converting unit 111, 112, or 113 selected by the gradation selecting unit 110 to the image signal and outputting a resultant signal to the output terminal 12. Since other construction is similar to that of the first embodiment, its description is omitted here. The luminance determination memory 115 temporarily stores the digital image signal before the gradation conversion which is output from the A/D converter 2*b*. The high luminance determining unit 116 discriminates the luminance of the image during the photographing on the basis of the digital image signal stored in the luminance determination memory 115 and outputs a discrimination result to the gradation selecting unit 110. A specific luminance discriminating method will be described hereinafter.

Figure 9:
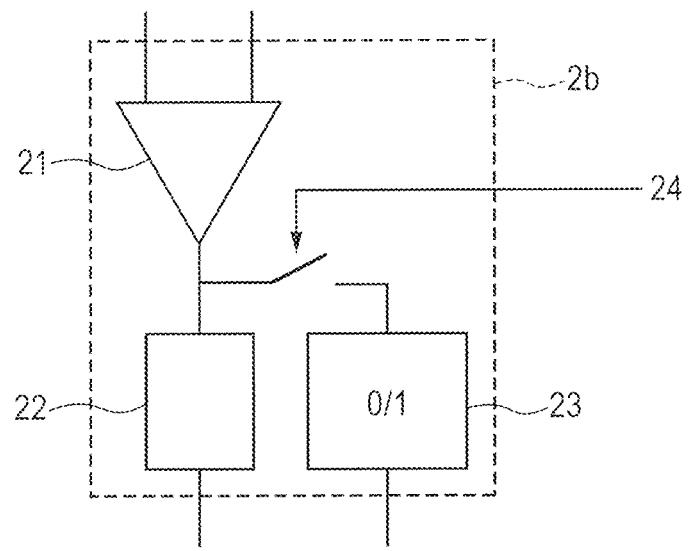
FIG. 9 is an equivalent circuit diagram illustrating a construction of an A/D converter in the image sensor according to the second embodiment of the invention.

FIG. 9 is an equivalent circuit diagram illustrating a construction of the A/D converter 2*b* in the image sensor 201*b* according to the second embodiment of the invention. As compared with the A/D converter 2 in the first embodiment, the A/D converter 2*b* in the second embodiment differs with respect to a point that it has a switch 24 which is controlled by a control signal LAT and a 0/1 latch circuit 23 of 1 bit connected to an output of the comparator 21 through the switch 24. The control signal LAT is supplied in common to all columns. The latch circuit 23 can store the output value of the comparator 21 at arbitrary time from the timing when the control signal LAT is controlled. Therefore, for example, by storing the value at specific time in a period of time between time t6 and t8 of the timing chart illustrated in FIG. 4, such bright pixel that the output of the comparator 21 is not inverted to the low level even at such specific time can be detected.

For example, the signal of the pixel in which the value stored in the latch circuit 23 is held at 1 (high level) is added in the horizontal direction (row direction) and the vertical direction (column direction) by an adder (not shown) of the image sensor 201*b*. Since the pixel in which the luminance in the relevant frame exceeds a predetermined threshold value can be counted, the A/D converter 2*b* can be used as a high luminance counter. The high luminance information obtained in this manner is transmitted to the high luminance determining unit 116.

Figure 10:
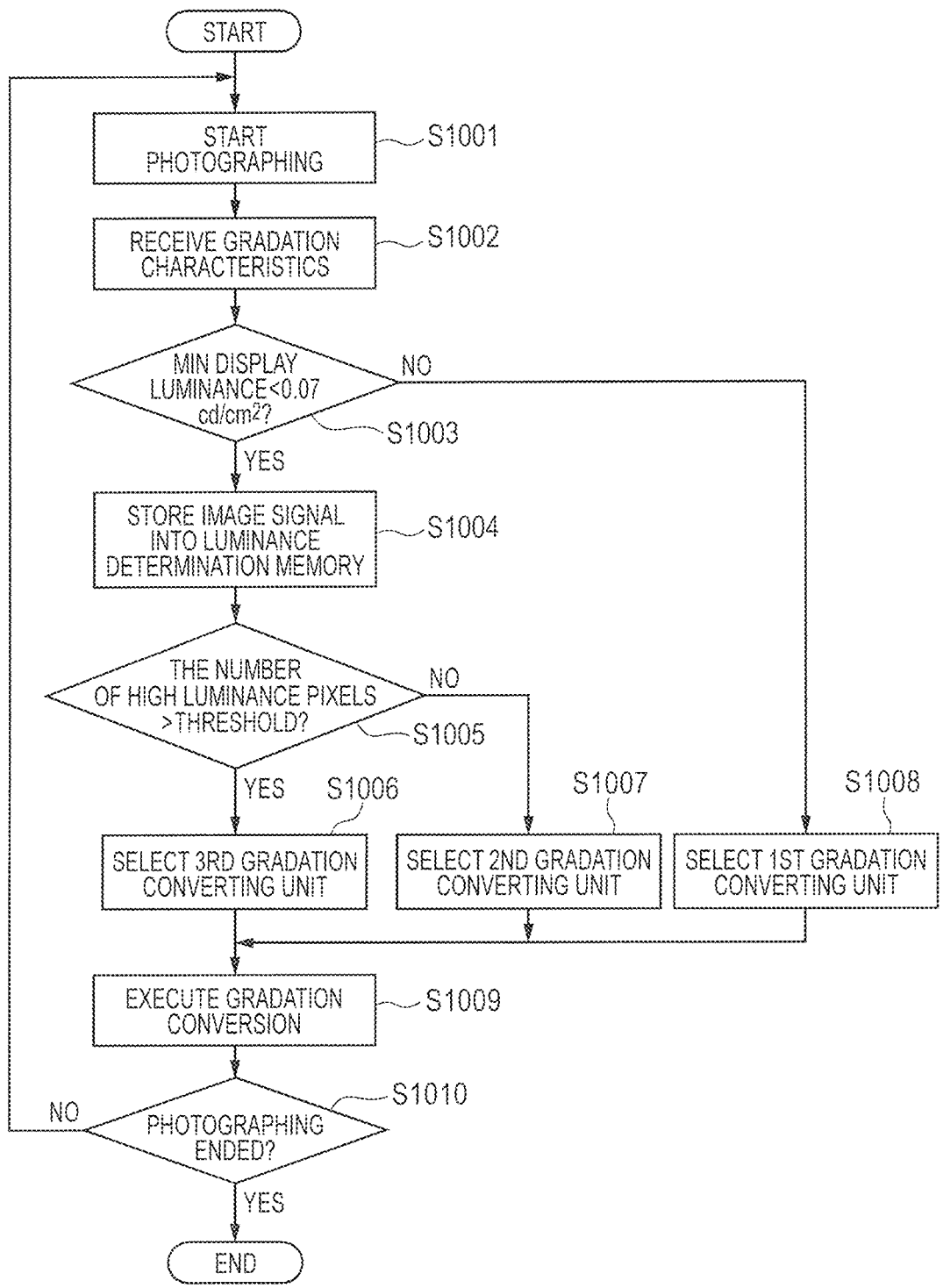
FIG. 10 is a flowchart illustrating an operation sequence of a gradation processing unit in the image sensor according to the second embodiment of the invention.

FIG. 10 is an example of a flowchart illustrating an operation sequence of the gradation processing unit 11*b* in the image sensor 201*b* according to the second embodiment of the invention. In step S1001, the photographing is started. In step S1002, the gradation characteristics designated by the user are received through the gradation characteristics receiving unit 209. As information of the gradation characteristics which are received, for example, there are the minimum display luminance which is required by the user and the like. In step S1003, if the minimum display luminance smaller than 0.07 cd/cm$^2$, the processing routine advances to step S1004. If it is equal to or larger than 0.07 cd/cm$^2$, step S1008 follows. In step S1004, the image signal is sequentially temporarily stored into the luminance determination memory 115 from the row in which the A/D conversion was finished.

In step S1005, a count result of the high luminance counter using the construction of the A/D converter 2*b* is compared with a predetermined threshold value. If it is determined that the count value of the high luminance counter is larger than the predetermined threshold value and the number of high luminance pixels is large, step S1006 follows. If it is determined that the count value of the high luminance counter is equal to or smaller than the threshold value and the number of high luminance pixels is not large, step S1007 follows. Such a discrimination based on the threshold value is performed in the high luminance determining unit 116. A result of the discrimination is transmitted to the gradation selecting unit 110.

In step S1006, the third gradation converting unit 113, that is, the input/output characteristics suitable for the display apparatus whose display luminance range is wide are selected. In step S1007, the second gradation converting unit 112, that is, the input/output characteristics in which although the display luminance range is wide, the gradations of the number larger than that in the third gradation converting unit 113 were allocated to the low luminance are selected. If many gradations are unevenly allocated to the luminance within a range from the low luminance to the high luminance like the third gradation converting unit 113 in spite of a fact that the number of high luminance pixels is small, the high luminance in which the number of pixels is small uses many gradations, so that a wasteful degree is large. Therefore, by selecting the input/output characteristics in which the logarithm (LOG) is used as a base, the number of gradations of the high luminance in which the number of pixels is small is reduced and a wasteful degree can be reduced. In addition, a larger number of gradations can be allocated to the luminance within a range from the low luminance in which the number of pixels is large to the middle luminance. In step S1008, the first gradation converting unit 111, that is, the input/output characteristics suitable for the display apparatus whose display luminance range is narrow are selected.

In step S1009, the gradation conversion of the digital image signal which was temporarily stored in the luminance determination memory 115 is performed by the one gradation converting unit selected in step S1006, S1007, or S1008. If the photographing was finished in step S1010, a flag to specify the gradation converting unit 111, 112, or 113 selected at the end of the frame is added to the image signal, a resultant signal is output, and the operation sequence of the gradation processing unit 11*b* is ended. Even in the case where any one of the gradation converting units having the different input/output characteristics among the frames was selected, when the image process is executed again in the image processing unit 203 or the display circuit 207, the characteristics of the gradation converting executed in the image sensor 201*b* can be taken into consideration. When the photographing is not finished, the processing routine is returned to step S1001. As mentioned above, according to the embodiment, while maintaining the effect of the first embodiment, the gradation conversion having the input/output characteristics which are more suitable for the photographing scene can be executed.

The foregoing high luminance counter is not always limited to the construction of the A/D converter 2*b* shown as an example. For example, a current monitor in the A/D converter 2*b* is provided and its current value can be also used as a high luminance counter. This is because if the number of bright pixels is large, a time which is required until the comparator 21 is inverted and the counter circuit 22 stops becomes long, and electric power consumption increases slightly. The number of high luminance pixels can be also discriminated on the basis of such a slight increase component. The image which was temporarily stored into the luminance determination memory 115 is analyzed by the high luminance determining unit 116 and the number of high luminance pixels whose luminance is equal to or larger than a predetermined threshold value or the number of low luminance pixels whose luminance is smaller than the predetermined threshold value may be counted. A low luminance counter may be constructed by the construction of the A/D converter 2b shown in the embodiment or it may be combined with the foregoing high luminance counter and may be made operative so as to select the input/output characteristics suitable for the scene from the three gradation converting units 111 to 113.

As mentioned above, in the embodiment, the luminance determining unit for discriminating the luminance of the digital image signal stored in the luminance determination memory is provided. The gradation selecting unit selects the gradation converting unit on the basis of a result of the discrimination by the luminance determining unit. Thus, the gradation converting unit having the optimum input/output characteristics can be selected in accordance with the photographing scene and the gradation conversion having the input/output characteristics which are more suitable for the photographing scene can be executed.

Third Embodiment

A construction of an image sensor according to the third embodiment of the invention will be described with reference to FIG. 11. In the second embodiment, although the gradation conversion having the input/output characteristics which are more suitable for the photographing scene can be executed, since the luminance determination memory 115 for temporarily storing the digital image signal before the gradation conversion is constructed, a scale of the image sensor 201 increases. Although it is easier than that in the case of improving the band adapted to transmit the image signal to the outside of the image sensor 201, a transmission band between the luminance determination memory 115 and the horizontal output line 105 has to be assured.

In the embodiment, therefore, an operation sequence of the gradation processing unit 11 which can execute the gradation conversion having the input/output characteristics which are suitable for the photographing scene without providing the luminance determination memory 115 of a large scale in the image sensor 201 will be described. As compared with the first embodiment, the third embodiment differs therefrom with respect to a flowchart showing the operation sequence of the gradation processing unit 11 illustrated in FIG. 6. Since other construction is similar to that in the first embodiment, its description is omitted.

Figure 11:
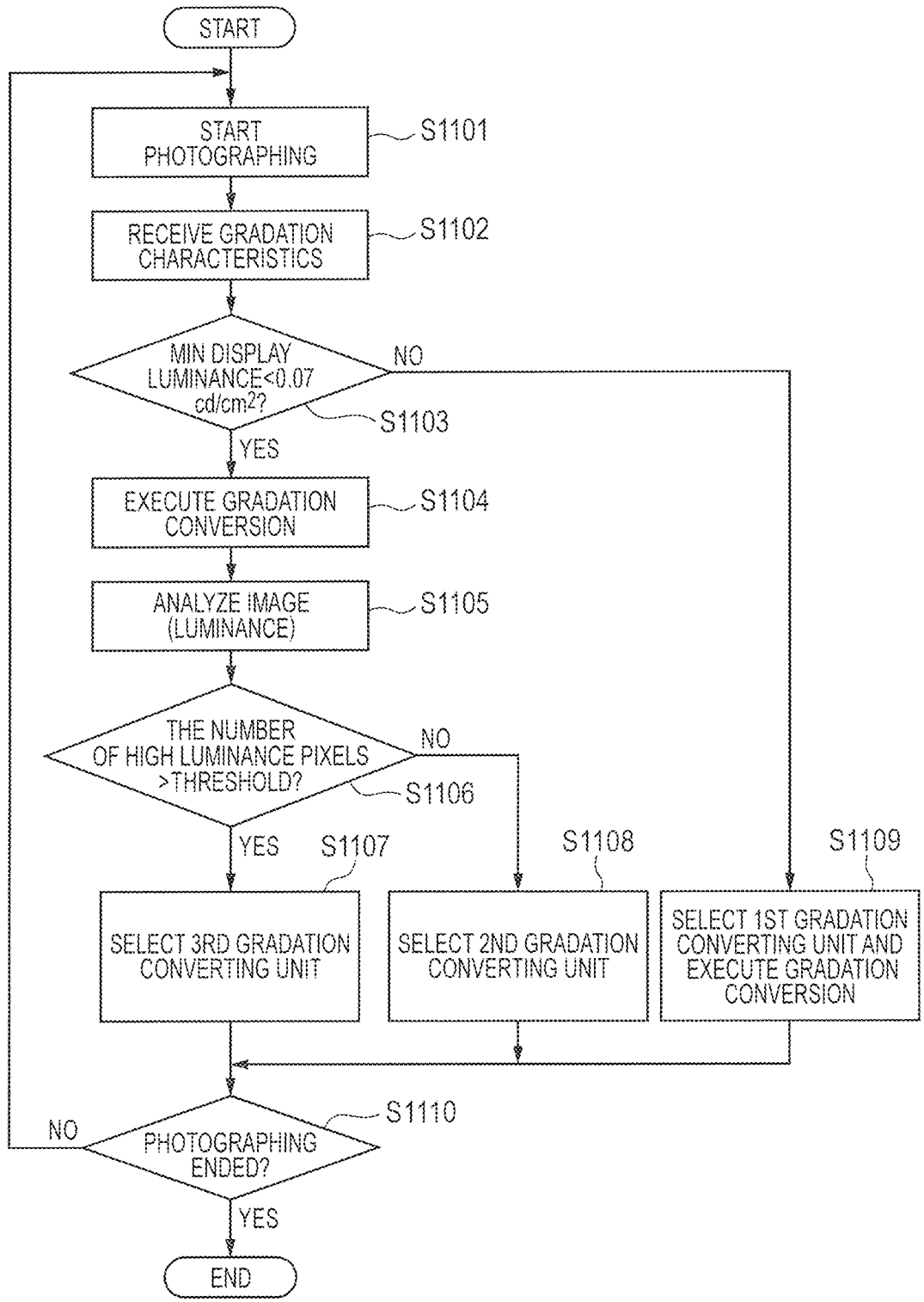
FIG. 11 is a flowchart illustrating an operation sequence of a gradation processing unit in an image sensor according to the third embodiment of the invention.

FIG. 11 is an example of the flowchart showing the operation sequence of the gradation processing unit 11 in the image sensor 201 according to the third embodiment of the invention. In step S1101, the photographing is started. In step S1102, the gradation characteristics which are designated by the user are received through the gradation characteristics receiving unit 209. As the gradation characteristics which are received, for example, there is the minimum display luminance which is required by the user or the like.

In step S1103, if the minimum display luminance is smaller than 0.07 cd/cm$^2$, S1104 follows. If it is equal to or larger than 0.07 cd/cm$^2$, S1109 follows. In step S1104, the gradation conversion is sequentially performed by the selected gradation converting unit 111, 112, or 113 from the row in which the A/D conversion was finished. The image signal is converted into a signal of a high speed differential serial transmission format such as LVDS or the like by the P/S converting unit 114 and is transmitted to the image processing unit 203 of the imaging apparatus through the output terminal 12. The transmitted image signal is temporarily stored into the image memory 202 of the imaging apparatus. Since an image analysis, which will be described hereinafter, is not executed to the first frame, the gradation conversion is performed in a state where the predetermined gradation converting unit (for example, the first gradation converting unit 111) has been selected.

In step S1105, the image processing unit 203 analyzes the image temporarily stored in the image memory 202 of the imaging apparatus. In step S1106, as a result of the image analysis by the image processing unit 203, the number of high luminance pixels is compared with a predetermined threshold value. If the number of high luminance pixels is larger than the predetermined threshold value, step S1107 follows. If it is equal to or smaller than the threshold value, step S1108 follows. Such a discrimination based on the threshold value is performed by the system control unit 204 of the imaging apparatus and a result of the comparison is transmitted to the gradation selecting unit 110 of the image sensor 201.

In step S1107, the third gradation converting unit 113, that is, the input/output characteristics suitable for the display apparatus whose display luminance range is wide are selected. In step S1108, the second gradation converting unit 112, that is, the input/output characteristics in which although the display luminance range is wide, the gradations of the number larger than that in the third gradation converting unit 113 were allocated to the low luminance and the logarithm (LOG) is used as a base are selected. In step S1109, the first gradation converting unit 111, that is, the input/output characteristics suitable for the display apparatus whose display luminance range is narrow are selected and the gradation conversion of the current frame is executed.

When the photographing is ended in step S1110, a flag to specify the gradation selected at the end of the frame is added to the image signal, a resultant signal is output, and the operation sequence of the gradation processing unit 11 is ended. Also in the case where the gradation converting units 111 to 113 having the input/output characteristics which differ among the frames were selected as mentioned above, when the image process is executed again by the image processing unit 203 and the display circuit 207, the characteristics of the gradation conversion executed in the image sensor 201 can be taken into consideration. If the photographing is not ended, the processing routine is returned to step S1101 and the above processes are repeated. In step S1104 in the second and subsequent times, the gradation conversion of the digital image signal of the next frame can be executed based on one kind of input/output characteristics selected in foregoing steps S1107, S1108, and S1109.

Since the information of the number of high luminance pixels of the previous frame is reflected and one of the gradation converting units 111 to 113 having the input/output characteristics suitable for the scene are selected in this manner, when a luminance change between the frames is gentle, the invention can be particularly applied. As a luminance information analysis in the image memory 202, besides a method of comparing with the threshold value as mentioned above, a histogram analysis and a combination of them can be mentioned. A luminance average value obtained every image area may be used.

As mentioned above, the embodiment, the gradation selecting unit selects the gradation converting unit on the basis of result of the luminance discrimination about the image stored in the image memory. The gradation converting unit having the optimum input/output characteristics can be selected in accordance with the photographing scene. The image sensor does not have the luminance determination memory or the like and an enlargement of the scale of the display apparatus can be suppressed.

Fourth Embodiment

Figure 12:
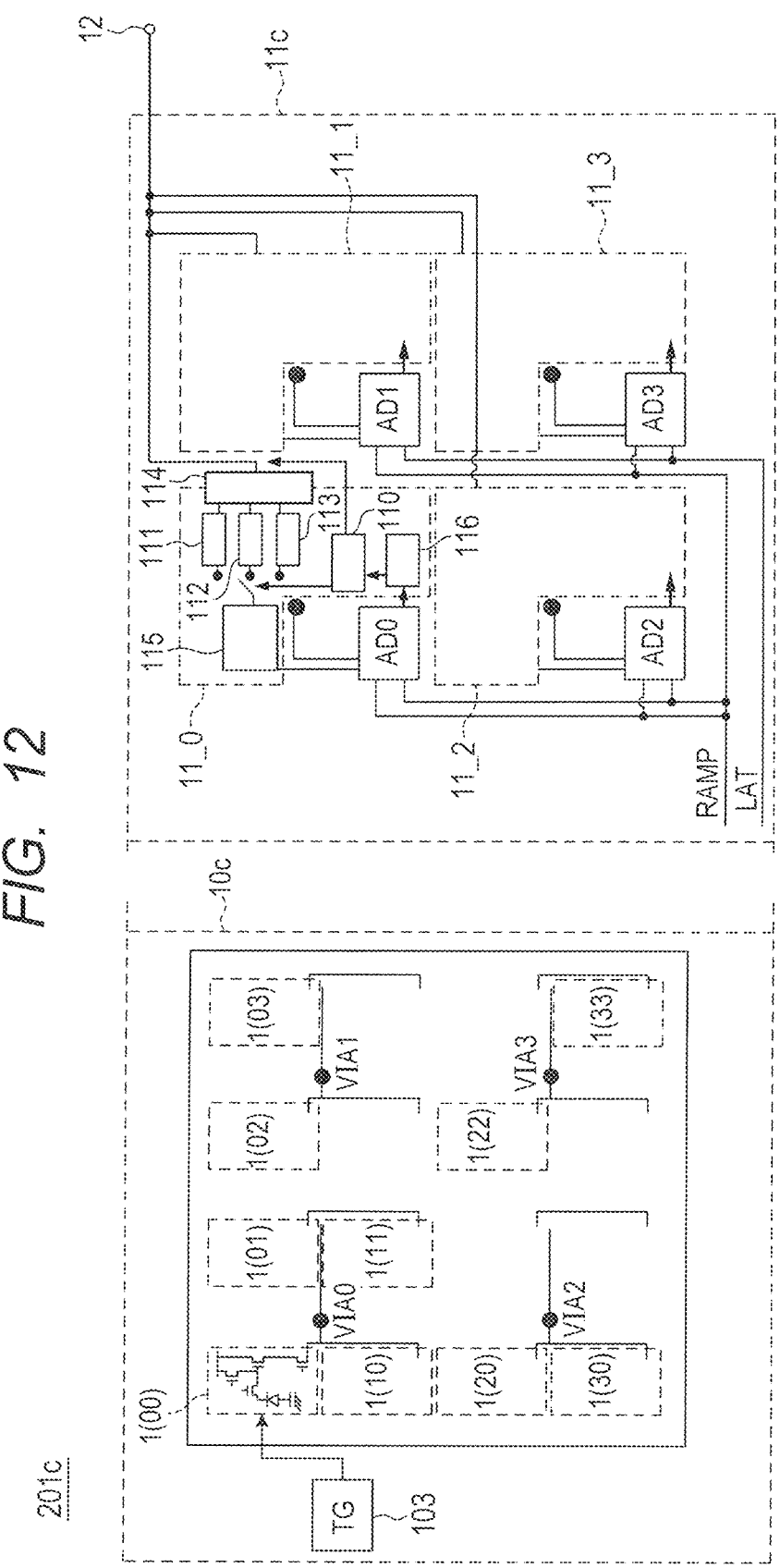
FIG. 12 is a block diagram illustrating a construction of an image sensor according to the fourth embodiment of the invention.
Figure 13:
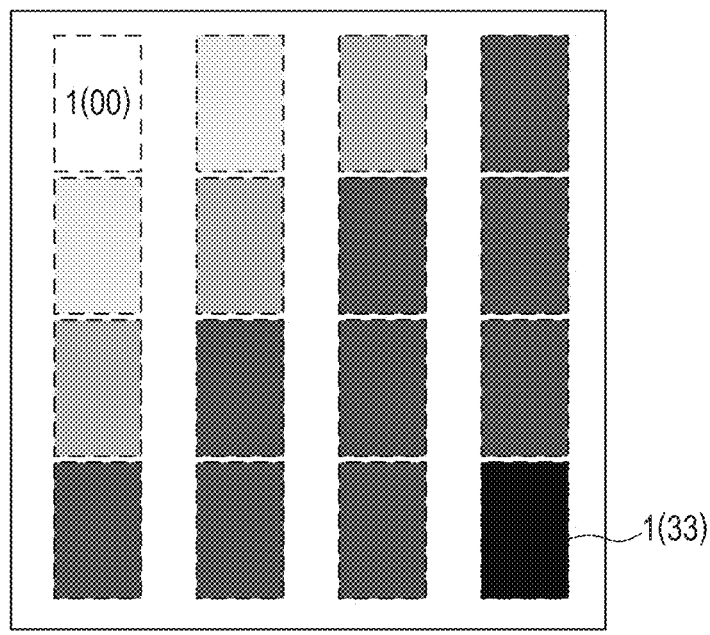
FIG. 13 is a schematic diagram illustrating a brightness of a digital image signal according to the fourth embodiment of the invention.

A construction of an image sensor according to the fourth embodiment of the invention will be described with reference to FIGS. 12 to 14. In the embodiment, modifications of the first to third embodiments will be described. FIG. 12 is an example of a block diagram illustrating a construction of an image sensor 201c according to the fourth embodiment. In the image sensor 201c, component elements common to those described in the first to third embodiments are designated by the same reference numerals and their detailed description is omitted here. Portions peculiar to the fourth embodiment and component elements which are used only in the fourth embodiment will be described hereinbelow.

An imaging unit 10c and a gradation processing unit 11c illustrated in FIG. 12 are separate semiconductor substrates and are electrically connected to each other by four via electrodes VIA0 to VIA3. As a via electrode, for example, a TSV (Through Silicon Via) or the like can be used.

In FIG. 12, in the imaging unit 10c, one via electrode VIA0 is shared by pixel areas having four pixels 1(00), 1(01), 1(10), and 1(11). Image signals of those four pixels are analog/digital converted by using an A/D converter AD0 of the gradation processing unit 11c. Similarly, also with respect to each of the via electrodes VIA1 to VIA3, it is shared by the four pixels and the image signals are analog/digital converted by using A/D converters AD1 to AD3 of the gradation processing unit 11c, respectively.

The timing generating circuit 103 sequentially makes selection control every four pixels which share a via electrode VIAq and the A/D converter ADq. For example, VIA0 and AD0 select the pixel 1 (00) and convert the signal which was photoelectrically converted by the pixel 1 (00) into a digital image signal in accordance with time t0 to t8 in the timing chart shown in FIG. 4 of the first embodiment. Similarly, also in VIA1 to VIA3 and AD1 to AD3, a pixel 1(02), a pixel 1(20), or a pixel 1(22) is selected and the image signal is converted into a digital image signal, respectively.

Gradation processing units 11_0 to 11_3 are respectively provided for the gradation processing unit 11c in correspondence to the four via electrodes VIA0 to VIAS and are connected to the corresponding A/D converters AD0 to AD3. Further, the image sensor 201c has the three gradation converting units 111 to 113 having different input/output characteristics, the gradation selecting unit 110, the luminance determination memory 115, the high luminance determining unit 116, and the P/S converting unit 114. If they are made operative in parallel every sharing unit of the via electrodes and the A/D converters, the digital image signal can be gradation converted at a higher speed. In a manner similar to the second embodiment, the A/D converter AD0 has a high luminance counter which uses the control signal LAT as a threshold control signal and it is used for the discrimination by the high luminance determining unit 116. A specific flag of the gradation converting unit 111, 112, or 113 selected by the gradation selecting unit 110 can be also added to the signal every sharing unit of the via electrodes and the A/D converters.

By the foregoing construction, the gradation converting units having the different input/output characteristics can be also selected every image area. For example, a case where the digital image signals including white, gray, and black to the pixels 1 (00) to 1(33) were obtained in accordance with a pixel distribution illustrated in FIG. 13 is presumed. The pixel 1 (00) is almost white and the pixel 1(33) is almost black. It is assumed that all of the fourteen pixels existing between those two pixels are gray and have a gentle luminance gradient. To such a scene, the high luminance counter of the A/D converter AD0 is liable to increase a count value, so that the third gradation converting unit 113 in which many gradations have been allocated to the high luminance is selected. On the contrary, the high luminance counter of the A/D converter AD3 is difficult to increase a count value, so that the second gradation converting unit 112 or the first gradation converting unit 111 in which many gradations have been allocated to the low luminance is selected. The high luminance counter of each of the A/D converters AD1 and AD2 indicates an intermediate count value between them, so that any one of the gradation converting units is selected in accordance with a result of the counting.

If the specific flag of the gradation converting unit 111, 112, or 113 selected ever pixel area is added and output to the output terminal 12 together with the gradation converted image signal, an area synthesis can be performed in the image processing unit 203 of the imaging apparatus in consideration of the flag information. For example, while the gradation converted image signal is set to a signal having a bit width of 12 bits and a band necessary to transmit the signal from the image sensor to the image processing unit 203 is reduced, such a dynamic range expanding process that the signal is converted into an image of a high gradation in which the maximum range is wider than $2^{12}$ LSB can be also executed in the image processing unit 203.

Figure 14:
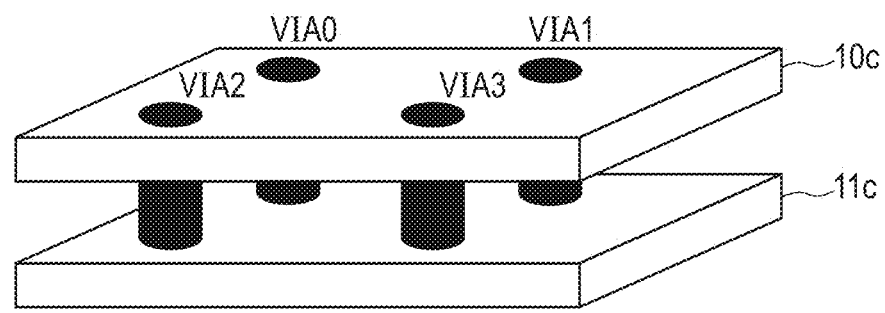
FIG. 14 is a perspective view illustrating the construction of the image sensor according to the fourth embodiment of the invention.

FIG. 14 is a perspective view illustrating a laminate structure of the imaging unit 10c and the gradation processing unit 11c of the image sensor 201c according to the fourth embodiment of the invention. If a manufacturing process of a semiconductor which was further microfabricated as compared with the imaging unit 10c having a photosensitive plane necessary for photographing is used, an extra space on the gradation processing unit 11c side is further increased. Therefore, by using the produced extra space, a circuit for processing information which is input to the high luminance determining unit 116 can be also newly added. For example, such an image analyzing circuit that an information amount is arithmetically operated every spatial frequency per luminance range and a luminance range having the largest information amount is specified or the like is also effective to embody the invention. Further, the invention can be also applied to such an imaging apparatus that the dynamic range expanding process by a high gradation image conversion is executed while suppressing an increase in band width.

As mentioned above, in the embodiment, the pixel unit is area-divided into a plurality of pixel areas and a plurality of gradation processing units each having the plurality of gradation converting units and the gradation selecting unit are provided in correspondence to each of the pixel areas. Thus, the gradation converting units having the different input/output characteristics can be also selected every image area. The semiconductor substrate including the gradation processing unit having the plurality of gradation converting units and the gradation selecting unit and the semiconductor substrate including the pixel areas where the pixel unit has been area-divided are overlaid and arranged in a laminate shape. Consequently, by using the produced extra space, a circuit for processing information which is input to the high luminance determining unit 116 can be also newly added.

Other Embodiments

The invention is not limited to the foregoing embodiments but many modifications are possible. For example, the constructions of the imaging apparatuses disclosed in the foregoing embodiments are merely shown as examples. The image sensor to which the invention can be applied is not limited to the constructions illustrated in FIGS. 1, 8, and 12. Further, the construction of the imaging apparatus is not limited to the construction illustrated in FIG. 2. Although the example in the case where the gradation processing unit 11 is constructed so as to have the three gradation converting units of the first gradation converting unit 111, the second gradation converting unit 112, and the third gradation converting unit 113 is shown in the foregoing embodiments, the invention is riot limited to such a construction. Naturally, even in the case where the gradation processing unit 11 is constructed so as to have N (N is a natural number of 2 or more) gradation converting units, similar effects are obtained.

Embodiment (s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD))™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-188759, filed Sep. 25, 2015, which is hereby incorporated by reference herein in its entirety.

What is claimed is:

1. An image sensor being an integral component of an electronic apparatus, the image sensor comprising:
   a plurality of light receiving portions;
   an A/D converter which converts output of the plurality of light receiving portions into image data;
   a gradation converter which performs a gradation conversion on the image data;
   a selector which selects gradation converting characteristics of the gradation conversion to the image data performed by the gradation converter; and
   an output terminal which outputs the gradation converted image data outside of the image sensor,
   wherein the selector is controlled to select the gradation converting characteristics by a system controller of the electronic apparatus on the basis of gradation characteristics of a display apparatus for displaying the image data, and
   wherein the gradation converting characteristics include information regarding a display luminance range or a contrast step of the display apparatus.

2. An image sensor according to claim 1, wherein:
   the pixel unit is area-divided into a plurality of pixel areas; and
   a plurality of gradation processors each having the gradation converter and the selector are provided in correspondence to each of the pixel areas.

3. An image sensor according to claim 2, wherein a plurality of A/D convertors are provided in correspondence to each of the pixel areas.

4. An image sensor according to claim 1, wherein the selector adds a flag to specify the selected gradation converting characteristics to the image data.

5. The image sensor according to claim 1, wherein the output gradation converted image data is smaller than the input image data, on which the gradation converter performs the gradation conversion.

6. An image sensor according to claim 1,
   wherein a plurality of semiconductor substrates are stacked in relation to each other and are electrically connected to each other by at least one electrode, and
   wherein the plurality of light receiving portions are arranged on a first semiconductor substrate, and at least the gradation processor and the selector are arranged on a second semiconductor substrate which is different from the first semiconductor substrate.

7. An image sensor according being an integral component of an electronic apparatus, the image sensor comprising:
   a plurality of light receiving portions;
   an A/D converter which converts output of the plurality of light receiving portions into image data;
   a gradation converter which performs a gradation conversion on the image data;
   a selector which selects gradation converting characteristics of the gradation conversion to the image data performed by the gradation converter;
   a memory which stores the image data;
   a luminance determining unit which discriminates a luminance of the image data stored in the memory; and
   an output terminal which outputs the gradation converted image data outside of the image sensor
   wherein the selector is controlled to select the gradation converting characteristics by a system controller of the electronic apparatus on the basis of a result of the discrimination by the luminance determining unit.

8. An image sensor according to claim 7, further comprising a counter which counts the number of pixels in which a luminance is equal to or larger than a predetermined threshold value or the number of pixels in which the luminance is smaller than the threshold value in the image data stored in the memory, and
   wherein the luminance determining unit discriminates the luminance of the image data stored in the memory on the basis of a count value by the counter.

9. An electronic apparatus comprising:
an image sensor being an integral component of the electronic apparatus, the image sensor including:
a plurality of light receiving portions,
an A/D converter which converts output of the plurality of light receiving portions into image data,
a gradation converter which performs a gradation conversion on the image data,
a selector which selects gradation converting characteristics of the gradation conversion to the image data performed by the gradation converter, and
an output terminal which outputs the gradation converted image data outside of the image sensor;
an image processor which executes a predetermined image process on the gradation converted image data; and
a system controller which controls the selector to select the gradation converting characteristics on the basis of gradation characteristics of a display apparatus for displaying the image data,
wherein the gradation converting characteristics include information regarding a display luminance range or a contrast step of the display apparatus.

10. The electronic apparatus according to claim 9, wherein the output gradation converted image data is smaller than the input image data, on which the gradation converter performs the gradation conversion.

11. An electronic apparatus according to claim 9,
wherein a plurality of semiconductor substrates are stacked in relation to each other and are electrically connected to each other by at least one electrode, and
wherein the plurality of light receiving portions are arranged on a first semiconductor substrate, and at least the gradation processor and the selector are arranged on a second semiconductor substrate which is different from the first semiconductor substrate.

12. An electronic apparatus according to claim 9, wherein the selector adds a flag to specify the selected gradation converting characteristics to the image data.

13. An electronic apparatus comprising:
an image sensor being an integral component of the electronic apparatus, the image sensor including:
a plurality of light receiving portions,
an A/D converter which converts output of the plurality of light receiving portions into image data,
a gradation converter which performs a gradation conversion on the image data,
a selector which selects gradation converting characteristics of the gradation conversion to the image data performed by the gradation converter,
a memory which stores the image data;
a luminance determining unit which discriminates a luminance of the image data stored in the memory; and
an output terminal which outputs the gradation converted image data outside of the image sensor;
an image processor which executes a predetermined image process on the gradation converted image data; and
a system controller which controls the selector to select the gradation converting characteristics on the basis of a result of the discrimination by the luminance determining unit.

14. An electronic apparatus according to claim 13, wherein the image sensor further comprising a counter which counts the number of pixels in which a luminance is equal to or larger than a predetermined threshold value or the number of pixels in which the luminance is smaller than the threshold value in the image data stored in the memory, and wherein the luminance determining unit discriminates the luminance of the image data stored in the memory on the basis of a count value by the counter.

* * * * *